United States Patent
Qin et al.

(10) Patent No.: US 10,859,850 B2
(45) Date of Patent: Dec. 8, 2020

(54) REFLECTIVE 3D DISPLAY DEVICE AND DISPLAY METHOD

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Weida Qin, Beijing (CN); Pan Guo, Beijing (CN); Wei Li, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 11 days.

(21) Appl. No.: 16/314,147

(22) PCT Filed: Apr. 4, 2018

(86) PCT No.: PCT/CN2018/081922
§ 371 (c)(1),
(2) Date: Dec. 28, 2018

(87) PCT Pub. No.: WO2018/184567
PCT Pub. Date: Oct. 11, 2018

(65) Prior Publication Data
US 2019/0227332 A1    Jul. 25, 2019

(30) Foreign Application Priority Data
Apr. 7, 2017    (CN) .......................... 2017 1 0225068

(51) Int. Cl.
*H04N 13/383*    (2018.01)
*H04N 13/365*    (2018.01)
(Continued)

(52) U.S. Cl.
CPC ......... *G02B 30/35* (2020.01); *G02B 26/0841* (2013.01); *G02B 27/0093* (2013.01);
(Continued)

(58) Field of Classification Search
CPC .... H04N 13/365; H04N 13/32; H04N 13/366; H04N 13/383
(Continued)

(56) References Cited

U.S. PATENT DOCUMENTS

2004/0100679 A1* 5/2004 Kuo ................... G02B 26/0841
359/291
2007/0296920 A1 12/2007 Mezouari et al.
(Continued)

FOREIGN PATENT DOCUMENTS

CN           1965590 A      5/2007
CN         101795420 A      8/2010
(Continued)

OTHER PUBLICATIONS

International Search Report dated Jun. 27, 2018 issued in corresponding International Application No. PCT/CN2018/081922.
(Continued)

*Primary Examiner* — Amir Shahnami
(74) *Attorney, Agent, or Firm* — Nath, Goldberg & Meyer; Joshua B. Goldberg

(57) ABSTRACT

A reflective 3D display device, including: a display panel which includes a plurality of columns of pixels, the plurality of columns of pixels include columns of left eye pixels and columns of right eye pixels, which are provided alternatively; an eye tracker, configured to identify location information of eyes of a human who is watching the display panel; and a plurality of MEMS reflectors, provided at a side of the display panel opposite to a display surface of the display panel, and configured to rotate according to the
(Continued)

location information of the eyes of the human to adjust an outgoing direction of light irradiated on the MEMS reflectors, so that light emitted from the left eye pixels is incident into a left eye of the human, and light emitted from the right eye pixels is incident into a right eye of the human, to form a 3D display picture.

4 Claims, 2 Drawing Sheets

(51) Int. Cl.
  *G02B 30/35* (2020.01)
  *G02B 26/08* (2006.01)
  *H04N 13/302* (2018.01)
  *G02B 27/00* (2006.01)
  *H04N 13/376* (2018.01)
  *H04N 13/32* (2018.01)
  *H04N 13/305* (2018.01)
  *G02B 30/27* (2020.01)

(52) U.S. Cl.
  CPC .......... *G02B 30/27* (2020.01); *H04N 13/302* (2018.05); *H04N 13/305* (2018.05); *H04N 13/32* (2018.05); *H04N 13/365* (2018.05); *H04N 13/376* (2018.05); *H04N 13/383* (2018.05)

(58) Field of Classification Search
  USPC .......................................... 348/78
  See application file for complete search history.

(56) References Cited

U.S. PATENT DOCUMENTS

| | | |
|---|---|---|
| 2011/0248911 A1 | 10/2011 | Si |
| 2014/0118511 A1 | 5/2014 | Hyde et al. |
| 2014/0118825 A1* | 5/2014 | Shikii .................... G02B 30/40 359/465 |
| 2014/0232746 A1 | 8/2014 | Ro et al. |
| 2016/0105665 A1 | 4/2016 | Wang et al. |

FOREIGN PATENT DOCUMENTS

| | | | |
|---|---|---|---|
| CN | 103605211 A | 2/2014 | |
| CN | 104597608 A | 5/2015 | |
| CN | 105527720 A | 4/2016 | |
| CN | 106937106 A | 7/2017 | |
| CN | 105527720 B * | 11/2017 | ............. G02B 30/26 |

OTHER PUBLICATIONS

Office Action dated Mar. 22, 2018 issued in corresponding Chinese Application No. 201710225068.3.
Second Office Action issued in corresponding Chinese Application No. 201710225068.3.
Office Action rejection dated Apr. 28, 2019 issued in corresponding Chinese Application No. 201710225068.3.

* cited by examiner

REFLECTIVE 3D DISPLAY DEVICE AND DISPLAY METHOD

CROSS-REFERENCE TO RELATED APPLICATIONS

This is a National Phase Application filed under 35 U.S.C. 371 as a national stage of PCT/CN2018/081922, filed Apr. 4, 2018, an application claiming the benefit of Chinese Application No. 201710225068.3, filed Apr. 7, 2017, the content of each of which is hereby incorporated by reference in its entirety.

TECHNICAL FIELD

The present disclosure relates to the field of display device, and in particular to a reflective 3D display device and a display method.

BACKGROUND

Stereoscopic display (i.e., 3D display) technology primarily acquires two images of an object from different viewing angles of a human, and then projects the two images respectively into the left eye and the right eye of the human so that there is a certain parallax between the images in the left eye and the right eye of the human. The brain of the human synthetizes the images in the left eye and the right eye of the human, thus a depth perception is produced, that is, a stereoscopic image is perceived. As such, the stereoscopic display technology produces a stereoscopic display effect.

Currently, 3D display technology is mainly divided into two types including a spectacle type and a naked eye type. A spectacle type 3D display technology requires a user to wear special purpose glasses, thus is inconvenient for a portable device. For mobile electronic products, more attention is paid to a naked eye type 3D display technology. The naked eye type 3D display technology mainly includes a columnar lens type 3D display technology and a grating type 3D display technology. However, for a columnar lens naked eye type 3D display technology, image overlapping may occur at certain viewing angles, resulting in a serious resolution loss, and the columnar lens naked eye type 3D display technology is not compatible with 2D mode; for a gating naked eye type 3D display technology, a low brightness may occurs, resulting in a serious resolution loss, and the gating naked eye type 3D display technology is strict with viewing angles.

SUMMARY

An embodiment of the present disclosure provides a reflective 3D display device, including: a display panel which includes a plurality of columns of pixels, the plurality of columns of pixels include columns of left eye pixels and columns of right eye pixels, which are provided alternatively, the left eye pixels are configured to form a left eye image, and the right eye pixels are configured to form a right eye image; an eye tracker, configured to identify location information of eyes of a human who is watching the display panel; and a plurality of MEMS reflectors, which are provided at a side of the display panel opposite to a display surface of the display panel, configured to rotate according to the location information of the eyes of the human to adjust an outgoing direction of light irradiated on the MEMS reflectors, so that light emitted from the left eye pixels in the display panel is incident into a left eye of the human, and light emitted from the right eye pixels in the display panel is incident into a right eye of the human, to form a 3D display picture.

In some implementations, the plurality of MEMS reflectors include first MEMS reflectors and second MEMS reflectors, the first MEMS reflectors are provided corresponding to the left eye pixels in an one-to-one correspondence mode, the second MEMS reflectors are provided corresponding to the right eye pixels in an one-to-one correspondence mode, each of the first MEMS reflectors is configured to rotate according to the location information of the left eye of the human collected by the eye tracker to adjust the outgoing direction of the light irradiated on each of the first MEMS reflectors, so that light emitted from the left eye pixels is incident into the left eye of the human, and each of the second MEMS reflectors is configured to rotate according to the location information of the right eye of the human collected by the eye tracker to adjust the outgoing direction of the light irradiated on each of the second MEMS reflectors, so that light emitted from the right eye pixels is incident into the right eye of the human.

In some implementations, the plurality of MEMS reflectors include first MEMS reflectors and second MEMS reflectors, multiple ones of the first MEMS reflectors are provided for each of the left eye pixels, multiple ones of the second MEMS reflectors are provided for each of the right eye pixels, the multiple ones of the first MEMS reflectors are configured to rotate according to the location information of left eyes, at different positions, collected by the eye tracker to adjust the outgoing direction of the light irradiated on each of the multiple ones of the first MEMS reflectors, so that light emitted from the left eye pixels is incident into the left eyes at different positions, and the multiple ones of the second MEMS reflectors are configured to rotate according to the location information of right eyes, at different positions, collected by the eye tracker to adjust the outgoing direction of the light irradiated on each of the multiple ones of the second MEMS reflectors, so that light emitted from the right eye pixels is incident into the right eyes at different positions.

In some implementations, the plurality of columns of pixels are divided into a plurality of pixel groups, each of the pixel groups includes one of the left eye pixels and one of the right eye pixels provided adjacently, the MEMS reflectors are provided corresponding to the pixel groups in an one-to-one correspondence mode, each of the MEMS reflectors is configured to rotate at a first timing according to the location information of the left eye of the human collected by the eye tracker to adjust the outgoing direction of the light irradiated on each of the MEMS reflectors, so that light emitted from the left eye pixels is incident into the left eye of the human, and rotate at a second timing according to the location information of the right eye of the human collected by the eye tracker to adjust the outgoing direction of the light irradiated on each of the MEMS reflectors, so that light emitted from the right eye pixels is incident into the right eye of the human.

In some implementations, the MEMS reflectors are electrostatic actuated MEMS reflectors.

In some implementations, the reflective 3D display device further includes a front light source provided at a side of the display surface of the display panel.

An embodiment of the present disclosure further provides a display method of a reflective 3D display device, the reflective 3D display device includes a display panel and a plurality of MEMS reflectors, the display panel includes a plurality of columns of pixels, the plurality of columns of pixels include columns of left eye pixels and columns of right eye pixels, which are provided alternatively, the display method including: controlling the left eye pixels in the display panel to display a left eye image and controlling the right eye pixels in the display panel to display a right eye image; identifying location information of eyes of a human who is watching the display panel; rotating the plurality of MEMS reflectors according to the location information of the eyes of the human to adjust an outgoing direction of light irradiated on each of the plurality of MEMS reflectors, so that light emitted from the left eye pixels in the display panel is incident into a left eye of the human, and light emitted from the right eye pixels in the display panel is incident into a right eye of the human, to form a 3D display picture.

In some implementations, in a case where the plurality of MEMS reflectors include first MEMS reflectors and second MEMS reflectors, the first MEMS reflectors are provided corresponding to the left eye pixels in an one-to-one correspondence mode, and the second MEMS reflectors are provided corresponding to the right eye pixels in an one-to-one correspondence mode, rotating the plurality of MEMS reflectors according to the location information of the eyes of the human to adjust the outgoing direction of light irradiated on each of the plurality of MEMS reflectors so that light emitted from the left eye pixels in the display panel is incident into the left eye of the human and light emitted from the right eye pixels in the display panel is incident into the right eye of the human to form a 3D display picture includes: rotating each of the first MEMS reflectors according to the location information of the left eye of the human collected by an eye tracker to adjust the outgoing direction of the light irradiated on each of the first MEMS reflectors, so that light emitted from the left eye pixels is incident into the left eye of the human to form the left eye image in the left eye of the human; and rotating each of the second MEMS reflectors according to the location information of the right eye of the human collected by the eye tracker to adjust the outgoing direction of the light irradiated on each of the second MEMS reflectors, so that light emitted from the right eye pixels is incident into the right eye of the human to form the right eye image in the right eye of the human.

In some implementations, in a case where the plurality of MEMS reflectors include first MEMS reflectors and second MEMS reflectors, multiple ones of the first MEMS reflectors are provided for each of the left eye pixels, and multiple ones of the second MEMS reflectors are provided for each of the right eye pixels, rotating the plurality of MEMS reflectors according to the location information of the eyes of the human to adjust the outgoing direction of light irradiated on the MEMS reflectors so that light emitted from the left eye pixels in the display panel is incident into the left eye of the human and light emitted from the right eye pixels in the display panel is incident into the right eye of the human to form a 3D display picture includes: rotating the multiple ones of the first MEMS reflectors according to the location information of left eyes, at different positions, collected by an eye tracker to adjust the outgoing direction of the light irradiated on each of the multiple ones of the first MEMS reflectors, so that light emitted from the left eye pixels is incident into the left eyes at different positions to form left eye images in the left eyes; and rotating the multiple ones of the second MEMS reflectors according to the location information of right eyes, at different positions, collected by the eye tracker to adjust the outgoing direction of the light irradiated on each of the multiple ones of the second MEMS reflectors, so that light emitted from the right eye pixels is incident into the right eyes at different positions to form right eye images in the right eyes.

In some implementations, in a case where the plurality of columns of pixels are divided into a plurality of pixel groups, each of the pixel groups includes one of the left eye pixels and one of the right eye pixels provided adjacently, and the plurality of MEMS reflectors are provided corresponding to the pixel groups in an one-to-one correspondence mode, controlling the left eye pixels in the display panel to display the left eye image and controlling the right eye pixels in the display panel to display the right eye image includes: at a first timing, writing data signal corresponding to the left eye image to the left eye pixels in the display panel; and at a second timing, writing data signal corresponding to the right eye image to the right eye pixels in the display panel. Correspondingly, rotating the plurality of MEMS reflectors according to the location information of the eyes of the human to adjust the outgoing direction of light irradiated on the MEMS reflectors so that light emitted from the left eye pixels in the display panel is incident into the left eye of the human and light emitted from the right eye pixels in the display panel is incident into the right eye of the human to form a 3D display picture includes: at the first timing, rotating each of the plurality of MEMS reflectors according to the location information of the left eye of the human collected by the eye tracker to adjust the outgoing direction of the light irradiated on each of the plurality of MEMS reflectors, so that light emitted from the left eye pixels is incident into the left eye of the human to form the left eye image in the left eye of the human; and at the second timing, rotating each of the plurality of MEMS reflectors according to the location information of the right eye of the human collected by the eye tracker to adjust the outgoing direction of the light irradiated on each of the plurality of MEMS reflectors, so that light emitted from the right eye pixels is incident into the right eye of the human to form the right eye image in the right eye of the human.

DESCRIPTION OF EMBODIMENTS

Figures 1, 2:
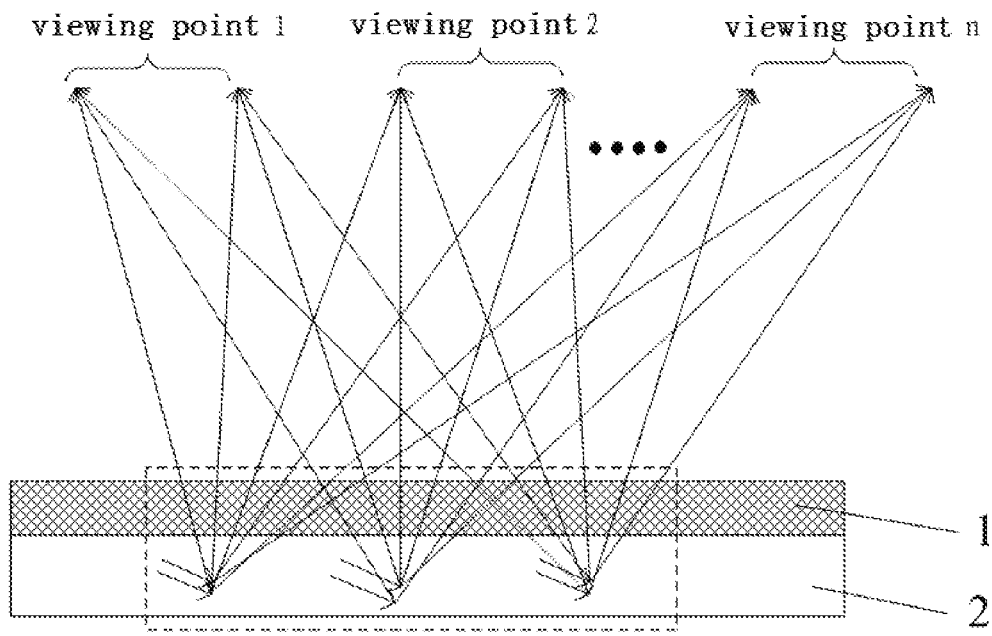
FIG. 1 shows a structural diagram of a reflective 3D display device in an embodiment of the present disclosure.
FIG. 2 shows a structural diagram of a display panel of a reflective 3D display device in an embodiment of the present disclosure.
Figure 3:
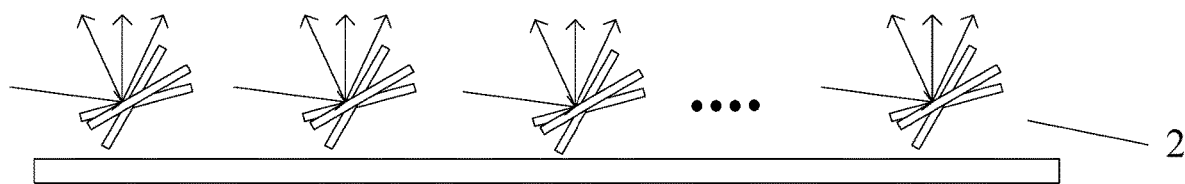
FIG. 3 shows a diagram of MEMS reflectors of a reflective 3D display device in an embodiment of the present disclosure.

In order to make a person skilled in the art understand technical solutions of the present disclosure better, the present disclosure will be described in detail below in conjunction with accompanying drawings and specific embodiments and implementations. As shown in. FIGS. 1 through 3, an embodiment of the present disclosure provides a reflective 3D display device, including: a display panel 1, an eye tracker and a plurality of MEMS (Micro-Electro-Mechanical Systems) reflectors 2. The display panel 1 includes a plurality of columns of pixels, the plurality of columns of pixels include columns of left eye pixels L and columns of right eye pixels R, which are provided alternatively, the left eye pixels L are configured to form a left eye image, and the right eye pixels R are configured to form a right eye image. The eye tracker is configured to identify location information of eyes of a human who is watching the display panel. The plurality of MEMS reflectors 2 are provided at a side of the display panel 1 opposite to a display surface of the display panel, and configured to rotate according to the location information of the eyes of the human to adjust an outgoing direction of light irradiated on the MEMS reflectors 2, so that light emitted from the left eye pixels L in the display panel 1 is incident into a left eye of the human, and light emitted from the right eye pixels R in the display panel 1 is incident into a right eye of the human, to form a 3D display picture.

Figure 4:
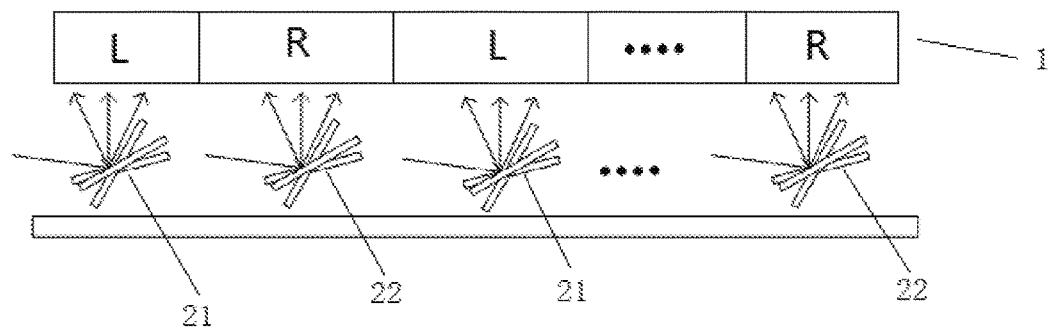
FIG. 4 shows a correspondence relationship between a display panel and MEMS reflectors in an implementation of an embodiment of the present disclosure.

In an implementation, as shown in FIG. 4, the plurality of MEMS reflectors 2 of the display device include first MEMS reflectors 21 and second MEMS reflectors 22, the first MEMS reflectors 21 are provided corresponding to the left eye pixels L in an one-to-one correspondence mode, the second MEMS reflectors 22 are provided corresponding to the right eye pixels R in an one-to-one correspondence mode. In such case, each of the first MEMS reflectors 21 is configured to rotate according to the location information of the left eye of the human collected by the eye tracker to adjust the outgoing direction of the light irradiated on each of the first MEMS reflectors 21, so that light emitted from the left eye pixels is incident into the left eye of the human, and each of the second MEMS reflectors 22 is configured to rotate according to the location information of the right eye of the human collected by the eye tracker to adjust the outgoing direction of the light irradiated on each of the second MEMS reflectors 22, so that light emitted from the right eye pixels is incident into the right eye of the human.

Specifically, by an image display controller, data signal corresponding to left eye images is written to the left eye pixels L in the display panel 1, and data signal corresponding to right eye images is written to the right eye pixels R in the display panel 1, so that the left eye images and the right eye images are displayed alternatively in a row direction. In such case, external light irradiates to the first MEMS reflectors 21 corresponding to positions of the left eye pixels L, the first MEMS reflectors 21 rotate according to the location information of the left eye of the human so that outgoing light has a directivity, the light with the directivity emits to the left eye of the human through the left eye pixels L in the display panel 1 to display the left eye image in the left eye of the human. Similarly, external light irradiates to the second MEMS reflectors 22 corresponding to positions of the right eye pixels R, the second MEMS reflectors 22 rotate according to the location information of the right eye of the human so that outgoing light has a directivity, the light with the directivity emits to the right eye of the human through the right eye pixels R in the display panel I to display the right eye image in the right eye of the human. Hereafter, the brain of the human analyzes and synthetizes the left eye image and the right eye image to achieve a naked eye 3D display.

Figure 5:
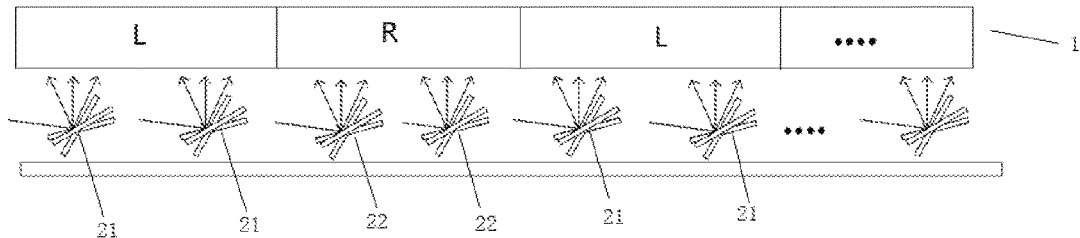
FIG. 5 shows a correspondence relationship between a display panel and MEMS reflectors in another implementation of the embodiment of the present disclosure.

In another implementation, as shown in FIG. 5, the plurality of MEMS reflectors 2 of the display device include first MEMS reflectors 21 and second MEMS reflectors 22, multiple ones of the first MEMS reflectors 21 are provided for each of the left eye pixels L, and multiple ones of the second MEMS reflectors 22 are provided for each of the right eye pixels R.

Specifically, by an image display controller, data signal corresponding to left eye images is written to the left eye pixels L in the display panel 1, and data signal corresponding to right eye images is written to the right eye pixels R in the display panel 1, so that the left eye images and the right eye images are displayed alternatively in a row direction. In such case, external light irradiates to the first MEMS reflectors 21 corresponding to the left eye pixels L, the first MEMS reflectors 21 rotate according to the location information of left eyes, at different positions, watching the display panel 1, so that outgoing light from the left eye pixels L has different directivities to enter into the left eyes at different positions, so as to form left eye images in the left eyes. Similarly, the second MEMS reflectors 22 rotate according to the location information of right eyes, at different positions, watching the display panel 1, so that outgoing light from the right eye pixels R has different directivities to enter into the right eyes at different positions, so as to display right eye images in the right eyes. As such, in a case where the display panel 1 is watched from a plurality of viewing points, 3D display is presented for each of the viewing points, and there is no loss of resolution.

In the implementation, the left eyes at different positions and the right eyes at different positions may refer to the left eye and the right eye of a same human (e.g., at different viewing points), or may refer to left eyes and right eyes of different human bodies.

Figure 6:
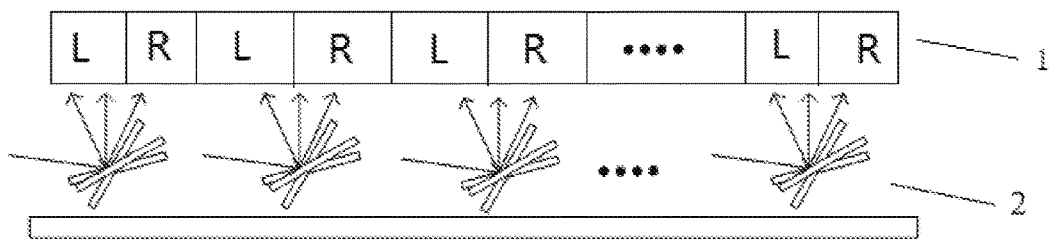
FIG. 6 shows a correspondence relationship between a display panel and MEMS reflectors in further another implementation of the embodiment of the present disclosure.

In further another implementation, as shown in FIG. 6, the plurality of columns of pixels are divided into a plurality of pixel groups, each of the pixel groups includes one of the left eye pixels L and one of the right eye pixels R provided adjacently, and the MEMS reflectors 2 are provided corresponding to the pixel groups in an one-to-one correspondence mode. Each of the MEMS reflectors 2 is configured to rotate at a first timing according to the location information of the left eye of the human collected by the eye tracker to adjust the outgoing direction of the light irradiated on each of the MEMS reflectors, so that light emitted from the left eye pixels is incident into the left eye of the human, and rotate at a second timing according to the location information of the right eye of the human collected by the eye tracker to adjust the outgoing direction of the light irradiated on each of the MEMS reflectors, so that light emitted from the right eye pixels is incident into the right eye of the human.

Specifically, at the first timing, by an image display controller, data signal corresponding to the left eye image is written to the left eye pixels L in the display panel 1, and in such case, external light irradiates to the MEMS reflectors 2, the MEMS reflectors 2 rotate according to the location information of the left eye of the human so that light reflected by the MEMS reflectors 2 is directed to the left eye of the human to display the left eye image in the left eye of the human. At the second timing, by the image display controller, data signal corresponding to the right eye image is written to the right eye pixels R in the display panel 1, and in such case, the MEMS reflectors 2 rotate according to the location information of the right eye of the human so that light reflected by the MEMS reflectors 2 is directed to the right eye of the human to display the right eye image in the right eye of the human. Hereafter, the brain of the human analyzes and synthetizes the left eye image and the right eye image to achieve a naked eye 3D display.

It should be noted that, each of the first timing and the second timing has a short duration, and an interval between the first timing and the second timing is small, so that the display pictures watched by the human are continuous.

In some implementations, the MEMS reflectors 2 are electrostatic actuated MEMS reflectors 2. The electrostatic actuated MEMS reflectors may be made of silicon material, the process for manufacturing the electrostatic actuated MEMS reflectors is completely compatible with that for MEMS, thus the process for manufacturing the electrostatic actuated MEMS reflectors is relatively simple, and in addition, the power consumption for driving the electrostatic actuated MEMS reflectors is low. The electrostatic actuated MEMS reflectors utilize electrostatic force of charges between capacitor plates to drive motion of MEMS microstructures, and the power consumption for driving is only of the order of microwatt. Certainly, the MEMS reflectors 2 may also be MEMS reflectors 2 of other driving mode.

In some implementations, the eye tracker may be a camera. Certainly, the eye tracker may also be other elements such as infrared elements.

In some implementations, the display panel 1 of the display device may be a liquid crystal display panel 1. Simultaneously, in a case where MEMS reflectors 2 are applied in the display device, an external light source may be utilized to replace a backlight source of the display panel 1, which results in a relatively low power consumption and a relatively thin display device. Certainly, the display device of the embodiment of the present disclosure may further include a front light source provided at a side of the display surface of the display panel. In such case, if ambient light is insufficient, the front light source can provide light to the display panel, the normal display of the display panel will not be affected.

As described above, the display panel 1 of the display device in the embodiment of the present disclosure includes a plurality of columns of pixels, the plurality of columns of pixels include columns of left eye pixels L and columns of right eye pixels R, which are provided alternatively, the left eye pixels L are configured to form the left eye image, and the right eye pixels R are configured to form the right eye image. Thus, by using the image display controller, left eye images and right eye images can be display alternatively in a row direction of the display panel 1. That is, by the image display controller, data signal corresponding to left eye images is written to the left eye pixels L, and data signal corresponding to right eye images is written to the right eye pixels R, so that the left eye images and the right eye images are displayed alternatively in a row direction of the display panel. In such case, the location information of eyes of the human watching the display panel is identified by the eye tracker, and is transmitted to the MEMS reflectors 2, the MEMS reflectors 2 rotate according to the identified location information of eyes of the human to adjust the outgoing direction of the light irradiated on the MEMS reflectors 2, so that the light emitted from the left eye pixels L of the display panel I is incident into the left eye of the human, and the light emitted from the right eye pixels R is incident into the right eye of the human, to form a 3D display picture. In addition, by adjusting the outgoing direction of the light through the MEMS reflectors, all viewers at multiple different positions (viewing point 1 through viewing point n) can watch a good 3D display effect, and since the pixels are not allocated to the viewing points respectively, there is no resolution loss. In brief, the reflective 3D display device of the present disclosure has a low power consumption and can provide flexible viewing points.

An embodiment of the present disclosure further provides a display method of a reflective 3D display device, the reflective 3D display device is any of the display devices described above, the display method including: controlling the left eye pixels L in the display panel 1 to display a left eye image and controlling the right eye pixels R in the display panel 1 to display a right eye image; identifying, by the eye tracker, location information of eyes of a human who is watching the display panel; and rotating the plurality of MEMS reflectors 2 according to the location information of the eyes of the human to adjust an outgoing direction of light irradiated on each of the plurality of MEMS reflectors 2, so that light emitted from the left eye pixels L in the display panel 1 is incident into the left eye of the human, and light emitted from the right eye pixels R in the display panel 1 is incident into the right eye of the human, to form a 3D display picture.

Specifically, when the reflective 3D display device of the embodiment is the display device as below, that is, in a case where the plurality of MEMS reflectors 2 include first MEMS reflectors 21 and second MEMS reflectors 22, the first MEMS reflectors 21 are provided corresponding to the left eye pixels L in an one-to-one correspondence mode, and the second MEMS reflectors 22 are provided corresponding to the right eye pixels R in an one-to-one correspondence mode, the step of rotating the plurality of MEMS reflectors 2 according to the location information of the eyes of the human to adjust the outgoing direction of light irradiated on each of the plurality of MEMS reflectors 2 so that light emitted from the left eye pixels L in the display panel 1 is incident into the left eye of the human and light emitted from the right eye pixels R in the display panel 1 is incident into the right eye of the human to form a 3D display picture includes: rotating each of the first MEMS reflectors 21 according to the location information of the left eye of the human collected by the eye tracker to adjust the outgoing direction of the light irradiated on each of the first MEMS reflectors 21, so that the light has directivity and light emitted from the left eye pixels L is incident into the left eye of the human to form the left eye image in the left eye of the human; and rotating each of the second MEMS reflectors 22 according to the location information of the right eye of the human collected by the eye tracker to adjust the outgoing direction of the light irradiated on each of the second MEMS reflectors 22, so that the light has directivity and light emitted from the right eye pixels R is incident into the right eye of the human to form the right eye image in the right eye of the human.

Hereafter, the brain of the human analyzes and synthesizes the left eye image and the right eye image, to achieve a naked eye 3D display.

When the reflective 3D display device of the embodiment is the display device as below, that is, in a case where the plurality of MEMS reflectors 2 include first MEMS reflectors 21 and second MEMS reflectors 22, multiple ones of the first MEMS reflectors 21 are provided corresponding to each of the left eye pixels L, and multiple ones of the second MEMS reflectors 22 are provided corresponding to each of the right eye pixels R, the step of rotating the plurality of MEMS reflectors 2 according to the location information of the eyes of the human to adjust an outgoing direction of light irradiated on the MEMS reflectors 2 so that light emitted from the left eye pixels L in the display panel 1 is incident into a left eye of the human and light emitted from the right eye pixels R in the display panel 1 is incident into a right eye of the human to form a 3D display picture includes: rotating the first MEMS reflectors 21 according to the location information of left eyes, at different positions, collected by the eye tracker to adjust the outgoing direction of the light irradiated on each of the first MEMS reflectors 21, so that the light has different directivities and light emitted from the left eye pixels L is incident into the left eyes at different positions to form left eye images in the left eyes; and rotating the second MEMS reflectors 22 according to the location information of right eyes, at different positions, collected by the eye tracker to adjust the outgoing direction of the light irradiated on each of the multiple ones of the second MEMS reflectors 22, so that the light has different directivities and light emitted from the right eye pixels is incident into the right eyes at different positions to form right eye images in the right eyes.

Hereafter, the brain of each human body analyzes and synthesizes the left eye image and the right eye image, a naked eye 3D display for multiple human bodies can be achieved.

When the reflective 3D display device of the embodiment is the display device as below, that is, in a case where the plurality of columns of pixels are divided into a plurality of pixel groups, each of the pixel groups includes one of the left eye pixels L and one of the right eye pixels R provided adjacently, and the plurality of MEMS reflectors 2 are provided corresponding to the pixel groups in an one-to-one correspondence mode, the step of controlling the left eye pixels L in the display panel 1 to display a left eye image and controlling the right eye pixels R in the display panel 1 to display a right eye image includes: at a first timing, writing data signal corresponding to the left eye image to the left eye pixels L in the display panel 1 to form the left eye image; and at a second timing, writing data signal corresponding to the right eye image to the right eye pixels R in the display panel 1 to form the right eye image. Correspondingly, rotating the plurality of MEMS reflectors 2 according to the location information of the eyes of the human to adjust the outgoing direction of light irradiated on the MEMS reflectors 2 so that light emitted from the left eye pixels L in the display panel 1 is incident into the left eye of the human and light emitted from the right eye pixels R in the display panel 1 is incident into the right eye of the human to form the 3D display picture includes: at the first timing, rotating each of the plurality of MEMS reflectors 2 according to the location information of the left eye of the human collected by an eye tracker to adjust the outgoing direction of the light irradiated on each of the plurality of MEMS reflectors 2, so that light emitted from the left eye pixels L is incident into the left eye of the human to form the left eye image in the left eye of the human; and at the second timing, rotating each of the plurality of MEMS reflectors 2 according to the location information of the right eye of the human collected by the eye tracker to adjust the outgoing direction of the light irradiated on each of the plurality of MEMS reflectors 2, so that light emitted from the right eye pixels R is incident into the right eye of the human to form the right eye image in the right eye of the human.

Hereafter, the brain of the human analyzes and synthesizes the left eye image and the right eye image, to achieve a naked eye 3D display.

It should be noted that, terms "row" and "column" in the present disclosure are only illustrative, and in a case where relative positions of the viewer and the display device are rotated or the like, the terms "row" and "column" may be interchanged.

It should be understood that, the above embodiments and implementations are merely exemplary embodiments and implementations for explaining principle of the present disclosure, but the present disclosure is not limited thereto. Various modifications and improvements may be made by those ordinary skilled in the art within the spirit and essence of the present disclosure, these modifications and improvements fall into the protection scope of the present disclosure.

The invention claimed is:

1. A reflective 3D display device, comprising:
 a display panel which comprises a plurality of columns of pixels, the plurality of columns of pixels comprise columns of left eye pixels and columns of right eye pixels, which are provided alternatively, the left eye pixels are configured to form a left eye image, and the right eye pixels are configured to form a right eye image;
 an eye tracker, configured to identify location information of eyes of a human who is watching the display panel; and
 a plurality of MEMS reflectors, which are provided at a side of the display panel opposite to a display surface of the display panel, configured to rotate according to the location information of the eyes of the human to adjust an outgoing direction of light irradiated on the MEMS reflectors, so that light emitted from the left eye pixels in the display panel is incident into a left eye of the human, and light emitted from the right eye pixels in the display panel is incident into a right eye of the human, to form a 3D display picture,
 wherein the plurality of the columns of pixels are divided into a plurality of pixel groups, each of the pixel groups comprises one of the left eye pixels and one of the right eye pixels provided adjacently, the MEMS reflectors are provided corresponding to the pixel group in an one-to-one correspondence mode,
 each of the MEMS reflectors is configured to rotate at a first timing according to the location information of the left eye of the human collected by the eye tracker to adjust the outgoing direction of the light irradiated on each of the MEMS reflectors, so that light emitted from the left eye pixels is incident into the left eye of the human, and rotate at a second timing according to the location information of the right eye of the human collected by the eye tracker to adjust the outgoing direction of the light irradiated on each of the MEMS reflectors, so that light emitted from the right eye pixels is incident into the right eye of the human.

2. The reflective 3D display device of claim 1, wherein the MEMS reflectors are electrostatic actuated MEMS reflectors.

3. The reflective 3D display device of claim 1, wherein the reflective 3D display device further incudes a front light source provided at a side of the display surface of the display panel.

4. A display method of the reflective 3D display device of claim 1, the display method comprising:
 controlling the left eye pixels in the display panel to display a left eye image and controlling the right eye pixels in the display panel to display a right eye image;
 identifying location information of eyes of a human who is watching the display panel; and
 rotating the plurality of MEMS reflectors according to the location information of the eyes of the human to adjust an outgoing direction of light irradiated on each of the plurality of MEMS reflectors, so that light emitted from the left eye pixels in the display panel is incident into a left eye of the human, and light emitted from the right eye pixels in the display panel is incident into a right eye of the human, to form a 3D display picture, wherein controlling the left eye pixels in the display panel to display the left eye image and controlling the right eye pixels in the display panel to display the right eye image comprises:

at a first timing, writing data signal corresponding to the left eye image to the left eye pixels in the display panel; and at a second timing, writing data signal corresponding to the right eye image to the right eye pixels in the display panel, and wherein rotating the plurality of MEMS reflectors accoording to the location information of the eyes of the human to adjust the outgoing direction of the light irradiated on the MEMS reflectors so that light emitted from the left eye pixels in the display panel is incident into the left eye of the human and light emitted from the right eye pixels in the display panel is incident into the right eye of the human to form the 3D display picture comprises:

at the first timing, rotating each of the plurality of MEMS reflectors according to the location information of the left eye of the human collected by the eye tracker to adjust the outgoing direction of the light irradiated on each of the plurality of MEMS reflectors, so that light emitted from the left eye pixels is incident into the left eye of the human to form the left eye image in the left eye of the human; and at the second timing, rotating each of the plurality of MEMS reflectors according to the location information of the right eye of the human collected by the eye tracker to adjust the outgoing direction of the light irradiated on each of the plurality of MEMS reflectors, so that light emitted from the right eye pixels is incident into the right eye of the human to form the right eye image in the right of the human.

* * * * *